(12) United States Patent
Kudo

(10) Patent No.: US 7,859,578 B2
(45) Date of Patent: Dec. 28, 2010

(54) RECORDING APPARATUS AND CONTROL METHOD THEREOF

(75) Inventor: Toshimichi Kudo, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 11/935,851

(22) Filed: Nov. 6, 2007

(65) Prior Publication Data

US 2008/0136935 A1    Jun. 12, 2008

(30) Foreign Application Priority Data

Dec. 6, 2006    (JP) .............................. 2006-329922

(51) Int. Cl.
*H04N 5/76*    (2006.01)
*H04N 7/14*    (2006.01)
*H04N 5/225*    (2006.01)

(52) U.S. Cl. ............... 348/231.1; 348/14.13; 348/220.1

(58) Field of Classification Search ............. 348/231.1, 348/333.04, 14.13, 387.1
See application file for complete search history.

(56) References Cited

U.S. PATENT DOCUMENTS

| | | | | |
|---|---|---|---|---|
| 5,032,927 | A * | 7/1991 | Watanabe et al. | ............ 386/101 |
| 5,576,840 | A * | 11/1996 | Fukushima | .................. 386/46 |
| 5,905,528 | A * | 5/1999 | Kodama | .................. 348/220.1 |
| 6,449,426 | B1 * | 9/2002 | Suga et al. | ................... 386/117 |
| 6,584,272 | B1 | 6/2003 | Fukushima et al. | |
| 6,751,405 | B1 | 6/2004 | Hasegawa | |
| 6,859,609 | B1 * | 2/2005 | Watkins | ........................ 386/46 |
| 6,980,703 | B2 * | 12/2005 | Araki | .......................... 382/305 |
| 7,321,390 | B2 * | 1/2008 | Toba | ......................... 348/231.2 |
| 7,573,510 | B2 * | 8/2009 | Iijima | ....................... 348/231.9 |
| 7,612,806 | B2 * | 11/2009 | Kazami et al. | ........... 348/231.1 |
| 2002/0003941 | A1 | 1/2002 | Hatae et al. | |
| 2005/0276569 | A1 | 12/2005 | Na | |
| 2006/0210241 | A1 | 9/2006 | Fukuda | |

FOREIGN PATENT DOCUMENTS

| | | |
|---|---|---|
| CN | 1241780 A | 1/2000 |
| CN | 1708116 A | 12/2005 |
| CN | 1835573 A | 9/2006 |
| JP | 2000-299840 A | 10/2000 |
| JP | 2002-084496 A | 3/2002 |
| JP | 2003-078743 | 3/2003 |

OTHER PUBLICATIONS

The above references were cited in a Mar. 6, 2009 Russian Office Action that issued in Russian Patent Application No. 2007145233, which is enclosed with English Translation.
The above references were cited in a Jul. 24, 2009 Chinese Office Action that issued in Chinese Patent Application No. 200710195571. 5, which is enclosed with English Translation.

* cited by examiner

*Primary Examiner*—Lin Ye
*Assistant Examiner*—Trung Diep
(74) *Attorney, Agent, or Firm*—Cowan, Liebowitz & Latman, P.C.

(57) ABSTRACT

A recording apparatus is able to suppress instances in which the user misses shutter opportunities or has to abort shooting due to insufficient remaining capacity on a recording medium. When the remaining capacity of the recording medium falls below a threshold, the user is allowed to set a desired recording duration. If it is determined that recording for the set desired recording duration at the target encoding data rate currently set is not possible, recording for the desired recording duration is enabled by automatically setting a recording mode that corresponds to a lower target encoding data rate, for example.

12 Claims, 5 Drawing Sheets

RECORDING APPARATUS AND CONTROL METHOD THEREOF

BACKGROUND OF THE INVENTION

1. Field of the Invention

The present invention relates to a recording apparatus and a control method thereof, and more particularly to a recording apparatus for recording moving image data after compressing the information volume, and a control method thereof.

2. Description of the Related Art

Heretofore, video cameras that take moving images and still images, and record these images to magnetic tape, memory card or the like together with sound are known. In recent years, video cameras (hereinafter, disk video cameras) that record images and sound to disk recording media such as DVD or hard disk drive (HDD) have also emerged.

Disk video cameras record captured moving image data to a disk recording medium after encoding the data using a high-efficiency coding scheme such as MPEG.

By adjusting quantization step width, the number of pixels and the like, many coding scheme including MPEG can change a compression ratio(%)=(pre-encoding data volume (d0)−encoded data volume(d1))/pre-encoding data volume (d0)*100.

The higher the compression ratio the smaller the data volume per unit time, although recorded picture quality deteriorates. On the other hand, a higher quality image can be recorded by reducing the compression ratio, although data volume also increases.

In view of this, disk video cameras are now provided with a plurality of recording modes at different picture qualities (compression ratios), and users can arbitrarily select one of recording modes (e.g., see Japanese Patent Laid-Open No. 2003-78743).

Users are thus able to appropriately switch the recording mode depending on the purpose of shooting, the duration of shooting or the like, enabling the limited recording capacity of disk media to be effectively used.

Typically, the remaining capacity on the recording medium and information about the status of use is displayed on an electronic viewfinder (EVF) screen or the like of the video camera. Video cameras with a plurality of recording modes at different compression ratios are able to increase the recordable duration if the remaining capacity on the recording medium is low, by switching from a high picture quality mode (low compression ratio recording mode) to a low picture quality mode (high compression ratio recording mode).

However, the user may conceivably forget to check the remaining capacity of the recording medium. It would not be unusual particularly for an inexperienced user who is not used to shooting with a video camera to become totally absorbed in following the subject, and not think to check the remaining capacity of the recording medium.

As a result, the user may first become aware that the recording medium has no more recording capacity when a message prompting him or her to change the recording medium is displayed. In this case, the user can either put in a new recording medium or else create recordable capacity by erasing recorded data.

However, deciding in a short time which video clips to erase when there are a large number of recorded video clips is extremely difficult. Shutter opportunities are missed as a result.

SUMMARY OF THE INVENTION

The present invention aims to resolve such problems, and provides a recording apparatus and a control method thereof that enable instances in which the user misses shutter opportunities or has to abort shooting due to insufficient remaining capacity on the recording medium to be suppressed.

According to an aspect of the present invention, there is provided a recording apparatus comprising: acquiring unit adapted to acquire moving image data; encoding unit adapted to encode the moving image data according to a target encoding data rate, and output encoded moving image data of the target encoding data rate; recording unit adapted to record the encoded moving image data to a recording medium; computing unit adapted to compute a recordable duration for recording the encoded moving image data of the target encoding data rate in the recording medium; display unit adapted to display on a display apparatus a setting screen for allowing a user to set a desired recording duration for the moving image data, in response to the recordable duration being less than a predetermined threshold; and control unit adapted to reduce the target encoding data rate so that the recordable duration for recording the encoded moving image data of the reduced target encoding data rate is greater than or equal to the desired recording duration, if the desired recording duration set via the setting screen is longer than the recordable duration for the moving image data of the target encoding data rate.

According to another aspect of the present invention, there is provided a control method of a recording apparatus, comprising the steps of: acquiring moving image data; encoding the moving image data according to a target encoding data rate, and outputting encoded moving image data of the target encoding data rate; recording the encoded moving image data to a recording medium; computing a recordable duration for recording the encoded moving image data of the target encoding data rate in the recording medium; displaying on a display apparatus a setting screen for allowing a user to set a desired recording duration for the moving image data, in response to the recordable duration being less than a predetermined threshold; and reducing the target encoding data rate so that the recordable duration for recording the encoded moving image data of the reduced target encoding data rate is greater than or equal to the desired recording duration is used in the encoding step, if the desired recording duration set via the setting screen is longer than the recordable duration for the moving image data of the target encoding data rate.

Additional features of the present invention will become apparent from the following description of exemplary embodiments, taken in conjunction with the accompanying drawings.

BRIEF DESCRIPTION OF THE DRAWINGS

FIG. 2 is a flowchart showing processing executed by a control unit 105 when the video camera is powered on.

DESCRIPTION OF THE EMBODIMENTS

Preferred embodiments of the present invention will now be described in detail in accordance with the accompanying drawings.

Figure 1:
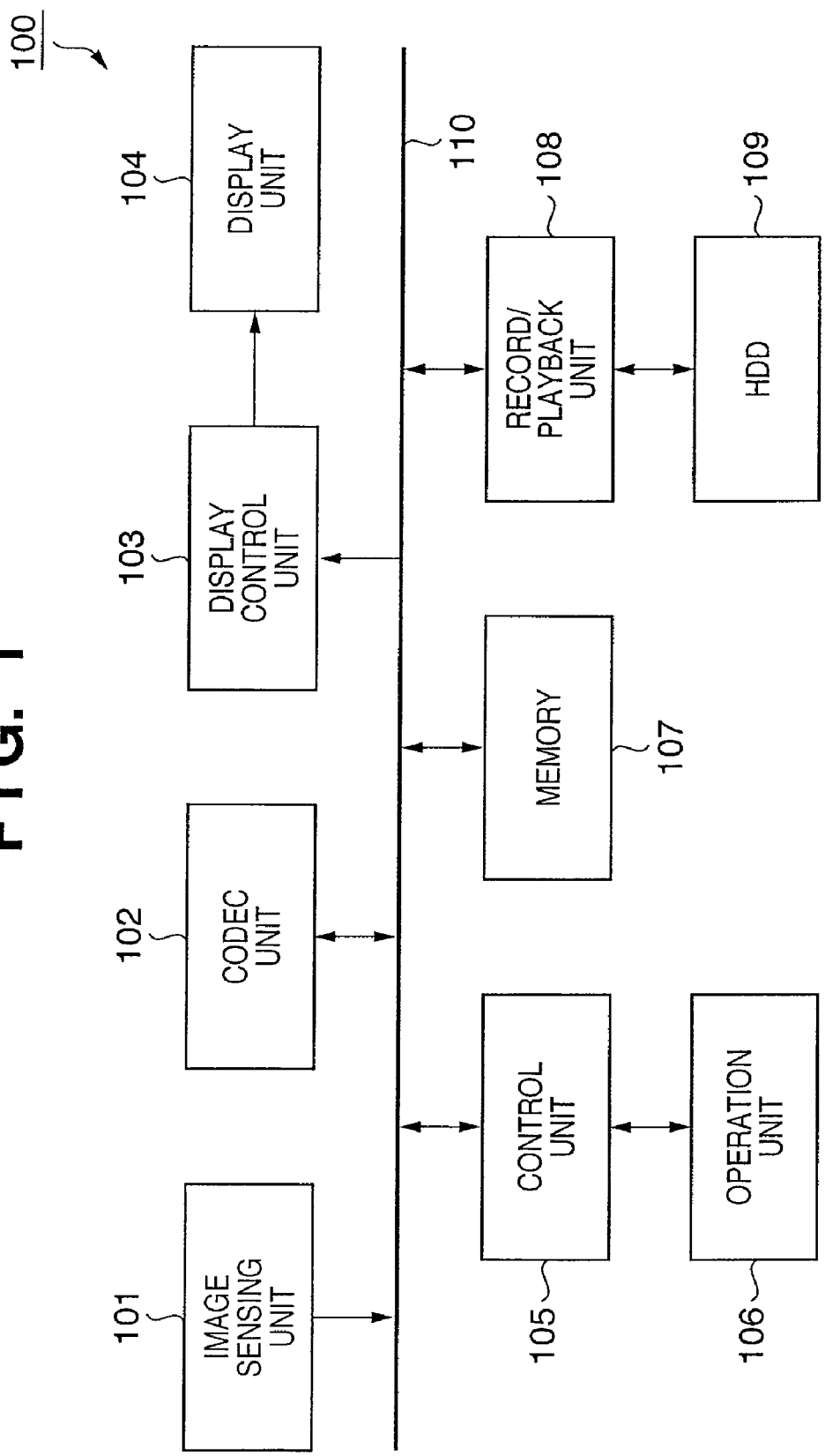
FIG. 1 shows an exemplary configuration of a video camera as an example of a recording apparatus according to a preferred embodiment of the present invention.

FIG. 1 shows an exemplary configuration of a video camera 100 as an example of a recording apparatus according to a preferred embodiment of the present invention.

In FIG. 1, an image sensing unit 101 that functions as an acquiring unit includes a known lens unit, an image sensor, and a camera signal processing unit. The image sensing unit 101 forms an image of the object on the image sensor using the lens unit that has an autofocus mechanism, and the image sensor, which is a CCD image sensor, a CMOS image sensor or the like, outputs an optical image of the object as a set of pixel signals. The camera signal processing unit A/D converts the pixel signals, performs so-called developing processes such as color interpolation and white balance processing on the converted signals, and outputs the result as moving image data.

A codec unit 102 encodes moving image data output by the image sensing unit 101 during shooting in MPEG2, and decodes encoded moving image data during playback. The codec unit 102 performs encoding so as to achieve the average bitrate (encoding data rate) of encoded moving image data, set by a control unit 105 (described later).

The display control unit 103 generates display data such as various setting menus, titles and durations when instructed by the control unit 105, and supplies the generated data to a display unit 104 together with moving image data. The display unit 104 is an LCD, for example, and displays images that depend on the display data and moving image data output from the display control unit 103.

The control unit 105 has an embedded microprocessor, and controls the entire video camera 100. An operation unit 106 is a group of operation switches, and includes various switches, button and the like operable by the user. Included among the switches and buttons in the operation unit 106 is an operating mode switching switch. The operating modes in the video camera 100 of the present invention include a camera mode mainly for shooting, a playback mode mainly for playback, and a power off mode that turns power off.

A memory 107 is used in the control processing of the control unit 105, and the encoding and decoding processes of the codec unit 102. A record/playback unit 108 records encoded moving image data to an HDD 109, as an exemplary disk recording medium, and reads encoded moving image data recorded on the HDD 109. In the present embodiment, the HDD 109 is integrated into the video camera 100, and is not removable.

The video camera 100 of the present embodiment has a plurality of recording modes for encoding and recording moving image data at mutually different target encoding data rates (or target compression ratios). The video camera 100 is assumed, for example, to have an XP (high picture quality) mode with an average target encoding data rate of 10 Mbps, an SP (standard picture quality) mode with an average target encoding data rate of 6 Mbps, and a LP (long play) mode with an average target encoding data rate of 4 Mbps.

The user can select a desired recording mode from these three recording modes by, for instance, operating the operation unit 106 to set the recording mode via a menu screen, or by operating a button for setting the recording mode. Information on the recording mode set by the user is stored in a nonvolatile memory (not shown) in the control unit 105, and is also held while the video camera is off.

Note that the video camera 100 of the present embodiment, similarly to a typical video camera, has a function of recording and playing audio data, in addition to recording and playing moving image data. Since audio data processing is not related to the present invention, a description of the recording and playing of audio data will not be given, although it should be noted that audio data is also recorded and played together with moving image data when moving image data is recorded and played. While not particularly described, the video camera 100 of the present embodiment also has a function of recording and playing still images.

Recording Process

The recording process by the video camera 100 will be described next.

When instructed by the operation unit 106 to start recording, the control unit 105 controls various units to start the recording operation. Moving image data output from the image sensing unit 101 is stored in the memory 107. The codec unit 102 sequentially performs compression coding on moving image data stored in the memory 107, and stores the encoded moving image data in the memory 107.

At this time, the codec unit 102 changes the encoding parameters in accordance with the recording mode set by the user, and performs controls so that encoded moving image data achieves the set target encoding data rate. The codec unit 102 also extracts the first moving image frame at the start of recording as a thumbnail image, and stores the thumbnail image in the memory 107.

The record/playback unit 108 reads encoded moving image data stored in the memory 107, and stores the read data on the HDD 109 after adding additional information including thumbnail image data. In the present embodiment, the series of moving image data recorded between the recording start instruction and the recording stop instruction is managed as a single moving image data file.

Also, moving image data output by the image sensing unit 101 is sent to the display control unit 103, both while recording is not being performed and while recording is being performed. The display control unit 103 displays this moving image data on the display unit 104 after adding necessary additional display information such as date/time, remaining battery power, and the like. The display unit 104 thus functions as a so-called electronic viewfinder (EVF).

Playback Process

The playback process by the video camera 100 will be described next.

When the user operates the operation unit 106 to instruct display of a thumbnail list screen, the control unit 105 controls the record/playback unit 108 to reproduce the thumbnail image data of moving image files recorded on the HDD 109 and send the data to the display control unit 103. The display control unit 103 uses the reproduced thumbnail image data to generate a list screen of thumbnail images of the moving image files recorded on the HDD 109, and displays the generated thumbnail list screen on the display unit 104.

The user selects desired moving image files while viewing the thumbnail list screen displayed on the display unit 104, and instructs playback start. In response to the playback start instruction, the control unit 105 controls the record/playback unit 108 to read moving image files corresponding to the specified thumbnails from the HDD 109. The read moving image data is stored in the memory 107. The codec unit 102 decodes the encoded moving image data stored in the memory 107, and stores the decoded moving image data in the memory 107. The display control unit 103 reads the decoded moving image data from the memory 107, and displays the read moving image data on the display unit 104.

The operations to read, decode and display moving image files are performed sequentially until all the moving image files have been read or a playback stop instruction is received.

Auto Recording Mode Setting Process

The auto recording mode setting process in the video camera of the present embodiment will be described next.

Figure 2:
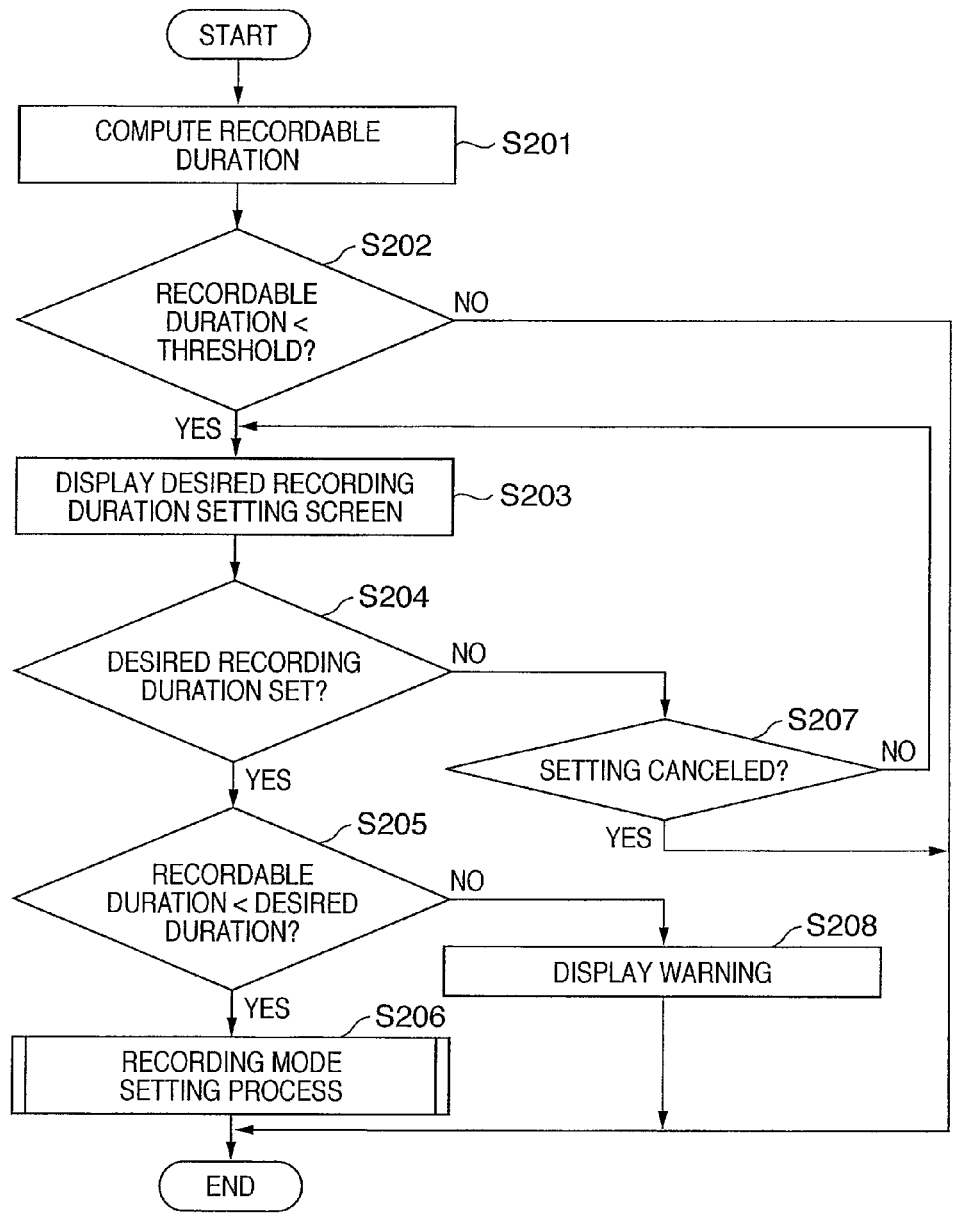

FIG. 2 is a flowchart showing processing executed by a control unit 105 when the video camera is powered on.

When the video camera is powered on, the control unit 105, as a computing means, uses the record/playback unit 108 to acquire the recordable capacity of the HDD 109. The recordable duration of the HDD 109 is then computed, based on a target data rate corresponding to the currently set recording mode (S201).

The control unit 105 then determines whether the computed recordable duration is less than a predetermined threshold (S202). Here, the threshold may be preset when the video camera 100 is shipped, or may be a value that the user can set arbitrarily.

If the recordable duration is greater than or equal to the threshold, the control unit 105 moves directly to normal processing, and the currently set recording mode is not changed.

On the other hand, if it is determined in S202 that the recordable duration is less than the threshold, the control unit 105, as a display means, controls the display control unit 103 to display a screen allowing the user to set a desired recording duration on the display unit 104 (S203). An exemplary screen for setting the desired recording duration is shown in FIG. 4B. Note that the process of inputting the desired recording duration will be described later.

Figure 5A:
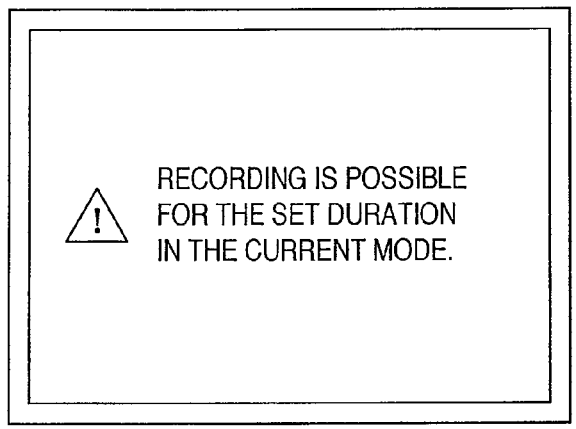
FIGS. 5A to 5C show exemplary display screens in the video camera of the preferred embodiment of the present invention.
Figure 5B:
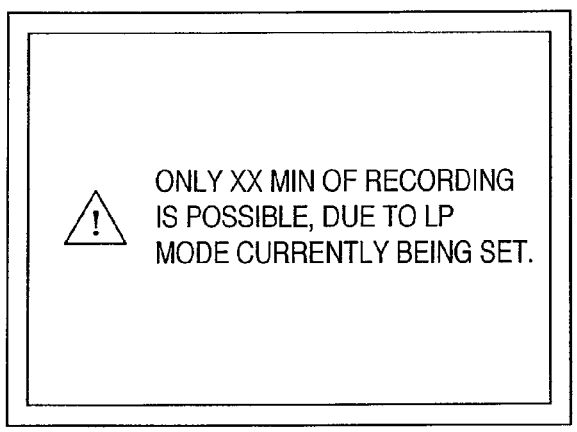

Next, the control unit 105 determines whether a desired recording duration has been set by the user via the setting screen (S204), and if it is set, determines whether the recordable duration computed in S201 is less than the desired recording duration (S205). If the recordable duration is greater than or equal to the desired recording duration, the currently set recording mode (target encoding data rate) need not be changed. The control unit 105 displays a message screen indicating that recording for the desired recording duration is possible without changing the recording mode, as shown in FIG. 5A, on the display unit 104 via the display control unit 103 (S208). The control unit 105 then ends the processing, with the recording mode in the currently set mode.

On the other hand, if it is determined in S205 that the recordable duration is less than the desired recording duration, the control unit 105 performs the auto recording mode setting process (S206). The auto recording mode setting process will be described later in detail.

The control unit 105 also determines whether setting has been canceled while waiting for a desired recording duration to be set in S204 (S207). If not canceled, the control unit 105 returns to S203, and waits for a desired recording duration to be set. If setting has been canceled, the processing is ended with the recording mode currently in the process of being set remaining unchanged, having assumed that the user does not intend to change the recording mode using a desired recording duration.

FIGS. 4A to 4E show exemplary display screens of the video camera 100 of the present embodiment.

Figure 4A:
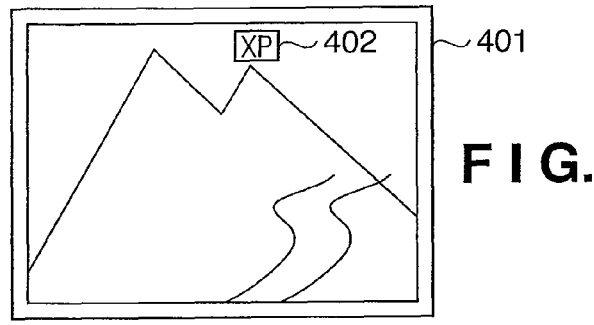
FIGS. 4A to 4E show exemplary display screens in the video camera of the preferred embodiment of the present invention.
Figure 4B:
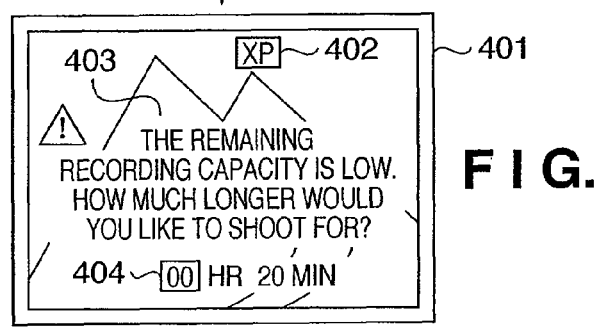

FIG. 4A shows an exemplary display screen of the display unit 104 when normal shooting is performed.

The reference numeral 401 denotes a display screen, while the reference numeral 402 denotes an additional display indicating the recording mode. Here, the additional display shows that XP mode is set.

FIG. 4B shows an exemplary screen for setting the desired recording duration.

The screen for setting the desired recording duration includes a message 403 informing the user that the recordable duration is low, and prompting the user to set how much longer he or she wants to shoot for. An area 404 for inputting the desired recording duration is provided, enabling the user to input hours and minutes by operating arrow keys or the like included in the operation unit 106. For example, keys signifying up, down and OK can be allocated in the operation unit 106, and the screen can be constituted so that the up and down keys are used to select numeric values, and the OK key is used to move from hours to minutes, and from minutes to setting completion.

Figure 4C:
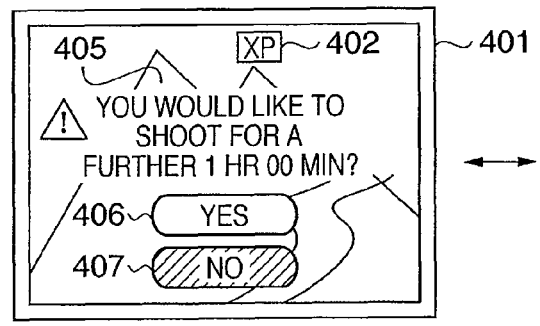

When the OK key is depressed twice to get to the setting completion state, the control unit 105 controls the display control unit 103 to display a setting confirmation screen such as shown in FIG. 4C on the display unit 104.

Figure 4D:
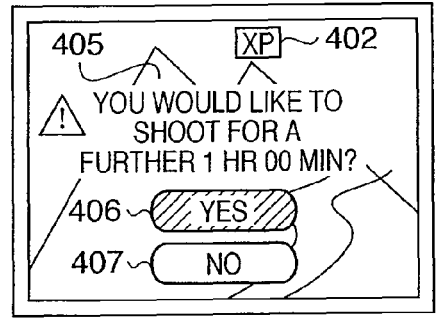

The setting confirmation screen includes a message 405 showing the user the set desired recording duration for confirmation, and prompting the user to confirm whether this reflects his or her desired recording duration. This screen also includes a "Yes" button 406 and a "No" button 407, with one of these buttons being changed to a selected state by operating the up/down keys, for example. FIG. 4C shows a state in which the "Yes" button 406 selected, while FIG. 4D shows a state in which the "No" button 407 selected. Depression of the OK key in the state shown in FIG. 4D is viewed as the setting cancellation of S207. Alternatively, a configuration is possible in which a separate key is allocated for the cancellation instruction, and depression of the OK key in the state shown in FIG. 4D returns the screen to the state shown in FIG. 4B.

When the OK key is depressed in the state shown in FIG. 4C, the control unit 105 determines that a desired recording duration has been set (S204: YES).

Figure 4E:
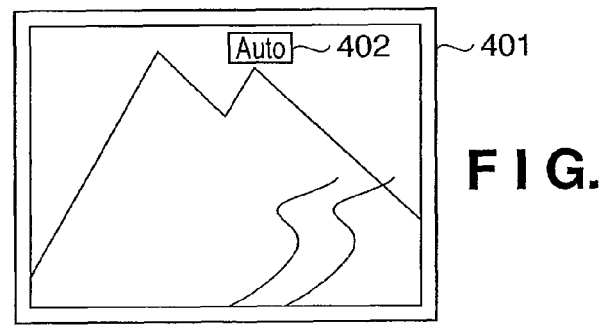

FIG. 4E shows an exemplary display screen during normal shooting, in the case where the recording mode has been changed in accordance with the desired recording duration as a result of the auto recording mode setting process (S206).

Since the recording mode is automatically set in this case, "Auto" indicating the auto recording mode setting state is additionally display.

Recording Mode Setting Process

Figure 3:
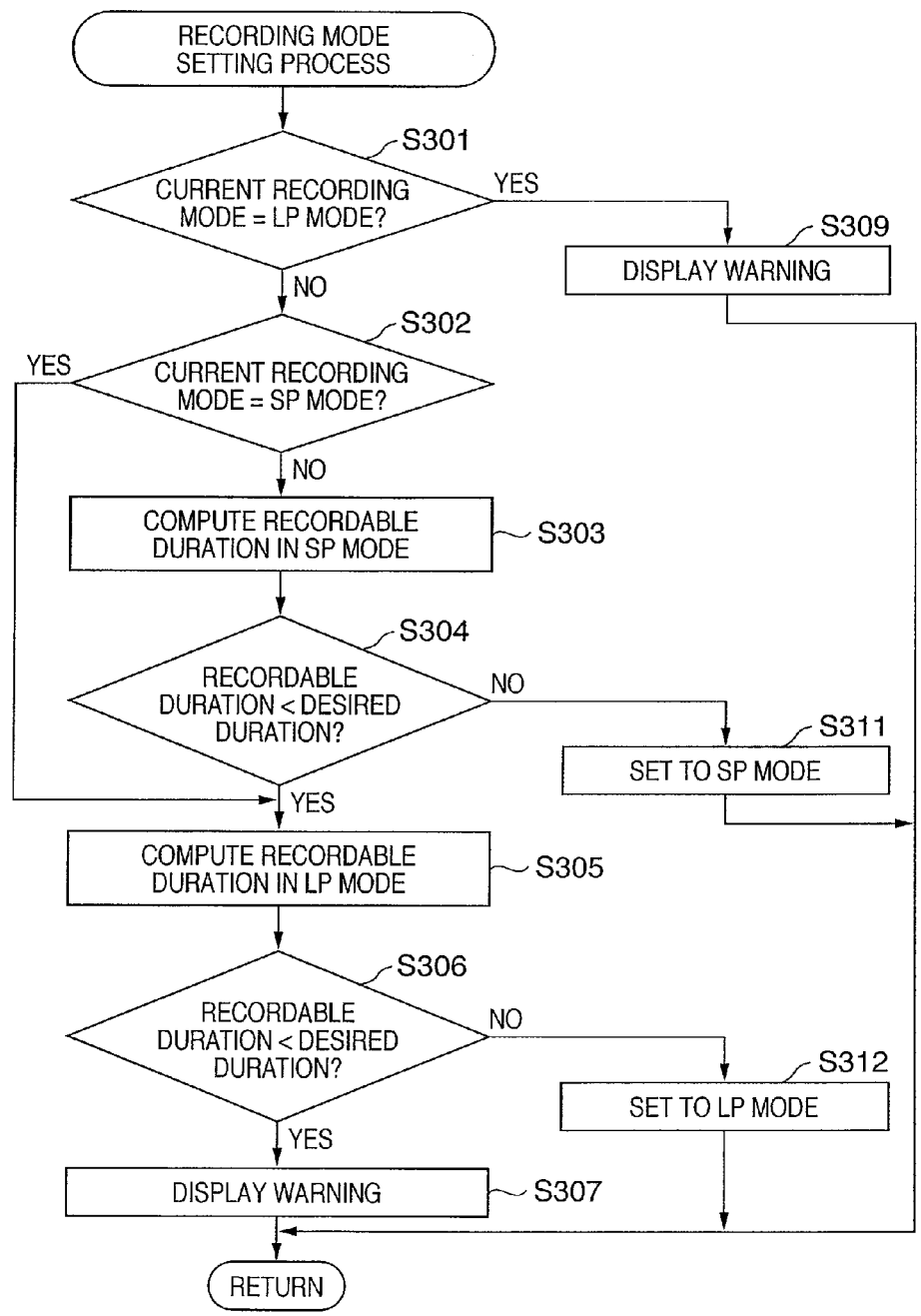
FIG. 3 is a flowchart detailing a recording mode setting process of S206 in FIG. 2.

The recording mode setting process of S206 in FIG. 2 will be described in detail next, using the flowchart shown in FIG. 3.

Firstly, the control unit 105 determines whether the currently set recording mode corresponds to the lowest target encoding data rate (in this case, LP mode) (S301). If the currently set recording mode is LP mode, there is no recording mode corresponding to a lower target encoding data rate, making it impossible to extend the recordable duration computed in S201 by changing the recording mode. Consequently, recording cannot be performed for longer than the recordable duration computed in S201. The control unit 105 controls the display control unit 103 to display a warning message such as that shown in FIG. B, for example, on the display unit 104 for a prescribed period (S309), and ends the processing without changing the recording mode (i.e., LP mode remains unchanged). Note that a warning message that makes use of the difference between the recordable duration and the desired recording duration may be displayed, such as "Recording is not possible for xx minutes of your desired recording duration."

If, in S301, the recording mode is not LP mode, the control unit 105 determines whether the current recording mode is SP mode (S302).

If not SP mode in S302, the recording mode is XP mode. Consequently, the control unit 105 computes the recordable duration in SP mode, which corresponds to the next lowest target encoding data rate after XP mode, with a similar method to S201 (S303). Specifically, the control unit 105 computes the recordable duration in SP mode, based on the remaining recording capacity of the HDD 109 and the target encoding data rate in SP mode. The control unit 105 then determines whether the computed recordable duration is less than the set desired recording duration (S304).

If the recordable duration is greater than or equal to the desired recording duration, the control unit 105 selects and sets SP mode from the recording modes (S311). The target encoding data rate corresponding to SP mode is thus set in the codec unit 102.

If, in S302, the current recording mode is SP mode, or if it is determined in S304 that the recordable duration is less than the desired recording duration, the processing moves to S305. Here, the control unit 105 computes the recordable duration in LP mode, which corresponds to a target encoding data rate lower than SP mode. Specifically, the control unit 105 computes the recordable duration, based on the remaining recording capacity of the HDD 109 and the target encoding data rate in LP mode. The control unit 105 then determines whether the computed recordable duration is less than the desired recording duration (S306).

If the recordable duration is greater than or equal to the desired recording duration, the control unit 105 selects and sets LP mode from the recording modes (S312).

Figure 5C:
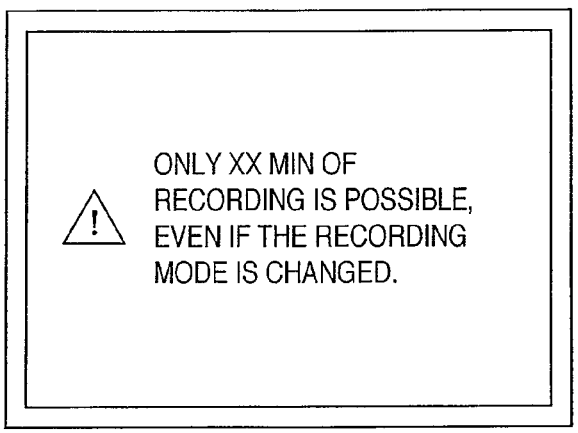

If it is determined in S306 that the recordable duration is less than the desired recording duration, recording for the desired recording duration is not possible even in LP mode corresponding to the lowest target encoding data rate. Therefore, the control unit 105 controls the display control unit 103 to display a warning message indicating that recording for longer than the recordable duration computed in S305 is not possible even if the recording mode is changed, as shown in FIG. 5C, on the display unit 104 for a prescribed period (S307).

Note that after displaying the warning message in S307, the recording mode may be switched to LP mode, so as to realize recording for as close as possible to the desired recording duration.

According to the present embodiment, processing is thus automatically executed to allow the user to set a desired recording duration, in the case where the free capacity or recordable capacity of the recording medium decreases, causing the recordable duration in the currently set recording mode to be less than a predetermined duration. The recording mode is then automatically set, according to the desired recording duration and the currently set recording mode. Missed shutter opportunities caused by insufficient recording capacity due to inattentiveness on the part of the user can therefore be suppressed. Also, picture quality will not be unnecessarily reduced or overly increased, since the recording mode is changed only if it is determined that recording for the desired recording duration is not possible in the currently set recording mode.

ADDITIONAL EMBODIMENTS

Note that although a video camera having three recording modes with different target encoding data rates was described in the foregoing embodiment, recording modes other than these can also be provided. A configuration in which the user is able to set arbitrary encoding data rates is also possible, apart from corresponding fixed target encoding data rates to recording modes.

In the foregoing embodiment, a recording mode that can achieve the desired recording duration is automatically selected in the auto recording mode setting process. However, it is also possible to appropriately set target encoding data rates other than those predetermined for each recording mode, so as to record for a desired recording duration that uses up all of the remaining recording capacity.

Also, although the auto recording mode setting process was described in the foregoing embodiment as part of the processing executed when the video camera is powered on, this process may be executed at a different timing. For example, a configuration is possible in which the auto setting process is executed after receiving a shooting stop instruction or executed periodically when shooting is not being performed, while the video camera is on.

Since the auto recording mode setting screen will, however, interfere with shooting in the case where the recordable duration during shooting is lower than a threshold, this screen preferably is display after the end of shooting rather than during shooting.

In the case where the recording mode is changed as a result of the auto setting process, the original settings may be stored in a nonvolatile memory in the control unit 105, and the recording mode may be returned to its original state when the video camera is powered off.

In the case where the user has changed the automatically set recording mode, the user's settings may be prioritized even if recording for the desired recording duration is no longer possible. Further, a configuration in which the user is able to use the default settings to select whether or not to execute the auto recording mode setting process is also possible.

Further, a video camera that uses non-interchangeable disk recording media was described in the foregoing embodiment, as an example that most clearly illustrates the effects of the present invention. However, the present invention is also applicable to recording apparatuses using arbitrary recording media that are interchangeable.

Although an example was given in the foregoing embodiment in which the present invention is applied to a video camera as a recording apparatus with an image sensing unit, an image sensing unit is not essential to the present invention, with any source or method of acquiring moving image data using encoding being acceptable. For example, moving image data may be acquired from an external device connected via a wired or wireless connection. Similarly, the decoding function is also not essential.

In the present specification, "encoding" also includes transcoding. Consequently, if the encoding data rate of encoded moving image data finally output by the codec unit 102 is variable, moving image data input to the codec unit 102 may be encoded with other schemes.

Further, in the foregoing embodiment, if the recordable duration computed in S201 is less than a threshold, the screen for setting the desired recording duration is displayed, regardless of the set recording mode. However, there is no point setting a desired recording duration if the target encoding data rate cannot be reduced any further, such as where LP mode has already been set. Consequently, a configuration is possible in which the control unit 105 checks the current recording mode between S202 and S203, and, if the lowest target encoding data rate has already been set, ends the processing after only warning that the recordable duration is low, without displaying the screen for setting the desired recording duration. In this case, the control unit 105 functions as a prevention means for preventing display of the setting screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-329922, filed on Dec. 6, 2006, which is hereby incorporated by reference herein in its entirety.

What is claimed is:

1. A recording apparatus comprising:
   acquiring unit adapted to acquire moving image data;
   encoding unit adapted to encode the moving image data acquired by the acquiring unit according to a target encoding data rate, and output encoded moving image data of the target encoding data rate;
   recording unit adapted to record the encoded moving image data to a recording medium;
   computing unit adapted to compute a recordable duration for recording the encoded moving image data of the target encoding data rate in the recording medium;
   detecting unit adapted to detect that the recordable duration computed by the computing unit is less than a predetermined threshold;
   display unit adapted to automatically display on a display apparatus a setting screen for allowing a user to set a desired recording duration for the moving image data, in response to the detecting unit detecting that the recordable duration is less than the predetermined threshold; and
   control unit adapted to, if the desired recording duration set via the setting screen is longer than the recordable duration for the moving image data of the target encoding data rate, automatically reduce the target encoding data rate so that the recordable duration for recording the encoded moving image data of the reduced target encoding data rate is longer than or equal to the desired recording duration, and control the encoding unit to encode the moving image data acquired by the acquiring unit according to the reduced target encoding data rate and to output the encoded moving image data of the reduced target encoding data rate.

2. The recording apparatus according to claim 1, wherein said apparatus has a plurality of recording modes in which said encoding unit outputs the encoded moving image data any one of different target encoded data rates, said control unit reduce the target encoding data rate in said encoding unit, by selecting a recording mode in which said encoding unit outputs the encoded moving image data of a lower encoding data rate than that of a currently set recording mode.

3. The recording apparatus according to claim 2, wherein the control unit selects a recording mode in which said encoding unit outputs the encoded moving image data of a highest encoding data rate, out of recording modes at which the recordable duration for recording the encoded moving image data of the reduced target encoding data rate is greater than or equal to the desired recording duration.

4. The recording apparatus according to claim 2, further comprising prevention unit adapted to prevent display of the setting screen by the display unit if the target encoding data rate is a lowest encoding data rate.

5. The recording apparatus according to claim 1, wherein if it is detected by the detecting unit that the recordable duration computed by the computing unit is less than the predetermined threshold, the display unit automatically displays the setting screen on the display apparatus at a prescribed timing.

6. The recording apparatus according to claim 1, wherein the detecting unit detects that the recordable duration for recording the encoded moving image data of the target encoding data rate is less than the predetermined threshold in response to the recording apparatus being powered on, and the display unit automatically displays the setting screen on the display apparatus in response to the detecting unit detecting that the recordable duration is less than the predetermined threshold.

7. The recording apparatus according to claim 1, wherein the acquiring unit includes an imaging unit.

8. The recording apparatus according to claim 1, wherein the control unit does not reduce the target encoding data rate, if the desired recording duration set via the setting screen is shorter than or equal to the recordable duration for the moving image data of the target encoding data rate.

9. The recording apparatus according to claim 1, further comprising:
   setting unit adapted to allow the user to set the target encoding data rate,
   wherein the computing unit computes the recordable duration for recording the encoded moving image data of the target encoding data rate set by the setting unit in the recording medium.

10. A control method of a recording apparatus, comprising the steps of:
    acquiring moving image data;
    encoding the acquired moving image data according to a target encoding data rate, and outputting encoded moving image data of the target encoding data rate;
    recording the encoded moving image data to a recording medium;
    computing a recordable duration for recording the encoded moving image data of the target encoding data rate in the recording medium;
    detecting that the computed recordable duration is less than a predetermined threshold;
    automatically displaying on a display apparatus a setting screen for allowing a user to set a desired recording duration for the moving image data, in response to detecting that the recordable duration is less than the predetermined threshold; and
    if the desired recording duration set via the setting screen is longer than the recordable duration for the moving image data of the target encoding data rate, automatically reducing the target encoding data rate so that the recordable duration for recording the encoded moving image data of the reduced target encoding data rate is longer than or equal to the desired recording duration, and encoding the acquired moving image data according to the reduced target encoding data rate and outputting the encoded moving image data of the reduced target encoding data rate.

11. An imaging apparatus comprising:
    an imaging unit;

an image quality setting unit adapted to set an image quality;

an encoding unit adapted to encode moving image data obtained by the imaging unit according to the image quality set by the image quality setting unit and to output encoded moving image data, wherein the encoding unit changes a data amount of the encoded moving image data according to the image quality set by the image quality setting unit;

a recording unit adapted to record the encoded moving image data on a recording medium;

a computing unit adapted to compute a recordable duration for recording the encoded moving image data of the image quality set by the image quality setting unit in the recording medium;

a display unit adapted to automatically display on a display apparatus a setting screen for allowing a user to set a desired recording duration for the moving image data, if the recordable duration is less than the predetermined threshold; and a control unit adapted to, if the desired recording duration set via the setting screen is longer than the recordable duration for the moving image data of the image quality set by the image quality setting unit, automatically degrade the image quality so that the recordable duration for recording the encoded moving image data of the degraded image quality is longer than or equal to the desired recording duration and control the encoding unit to encode the moving image data obtained by the imaging unit according to the degraded image quality and to output the encoded moving image data of the degraded image quality.

12. The imaging apparatus according to claim 11, wherein the display unit automatically displays the setting screen on the display apparatus in response to the imaging apparatus being powered on.

* * * * *